United States Patent [19]
Dubroc

[11] Patent Number: 4,886,143
[45] Date of Patent: Dec. 12, 1989

[54] HUNTER'S TREE STAND

[76] Inventor: Donald J. Dubroc, 2008 Roosevelt Blvd., Kenner, La. 70062

[21] Appl. No.: 316,645

[22] Filed: Feb. 28, 1989

[51] Int. Cl.⁴ ............... A45F 3/26; A01M 31/02
[52] U.S. Cl. ............................. 182/142; 182/187
[58] Field of Search .............. 182/187, 188, 142; 108/152

[56] References Cited

U.S. PATENT DOCUMENTS

| | | | |
|---|---|---|---|
| 1,409,800 | 3/1922 | Turner | 182/187 |
| 2,881,029 | 4/1959 | Tollefsen | 182/142 |
| 3,485,320 | 12/1969 | Jones | 182/187 |
| 4,130,180 | 12/1978 | Ferguson | 182/187 |
| 4,337,844 | 7/1982 | Hice | 182/187 |
| 4,347,913 | 9/1982 | Cromer | 182/142 |
| 4,347,914 | 9/1982 | Gary | 182/142 |
| 4,417,645 | 11/1983 | Untz | 182/187 |
| 4,458,782 | 7/1984 | Meyer | 182/187 |

Primary Examiner—Reinaldo P. Machado
Attorney, Agent, or Firm—George A. Bode; Michael L. Hoelter

[57] ABSTRACT

An apparatus for engaging substantially upright columnar members, including trees, for supporting a person above the ground. This apparatus includes a support secured to a columnar member and a seat assembly suspended from the support. This seat assembly is fully pivotable around a generally vertical axis and it is spaced from the columnar member to enable a user to rotate 360° with respect to the support and columnar member.

18 Claims, 4 Drawing Sheets

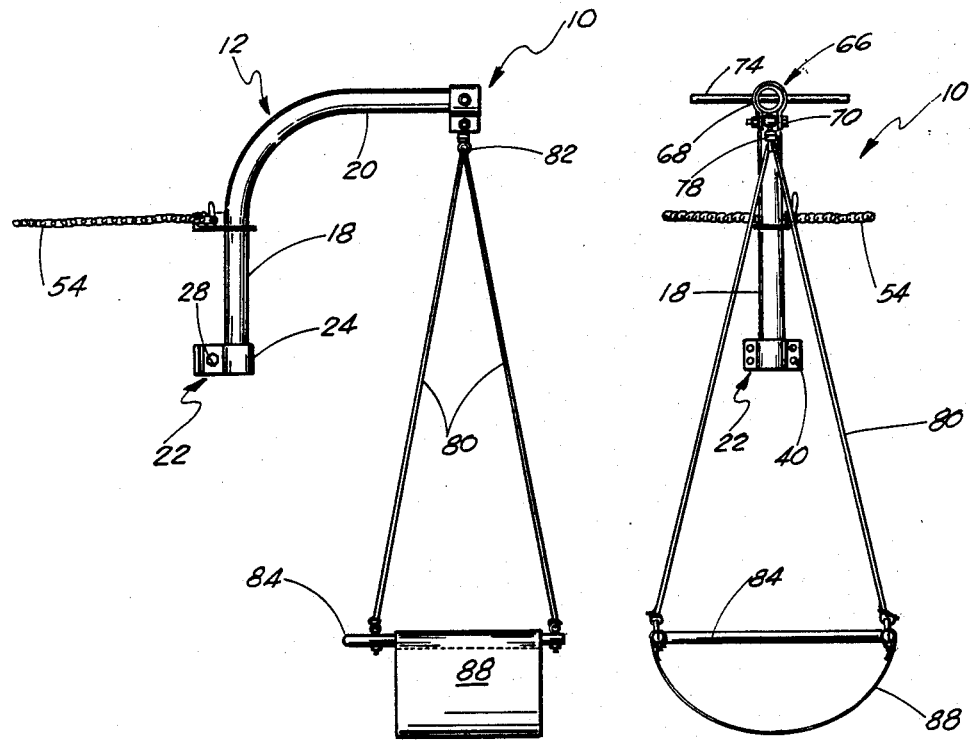
FIG. 1
FIG. 2
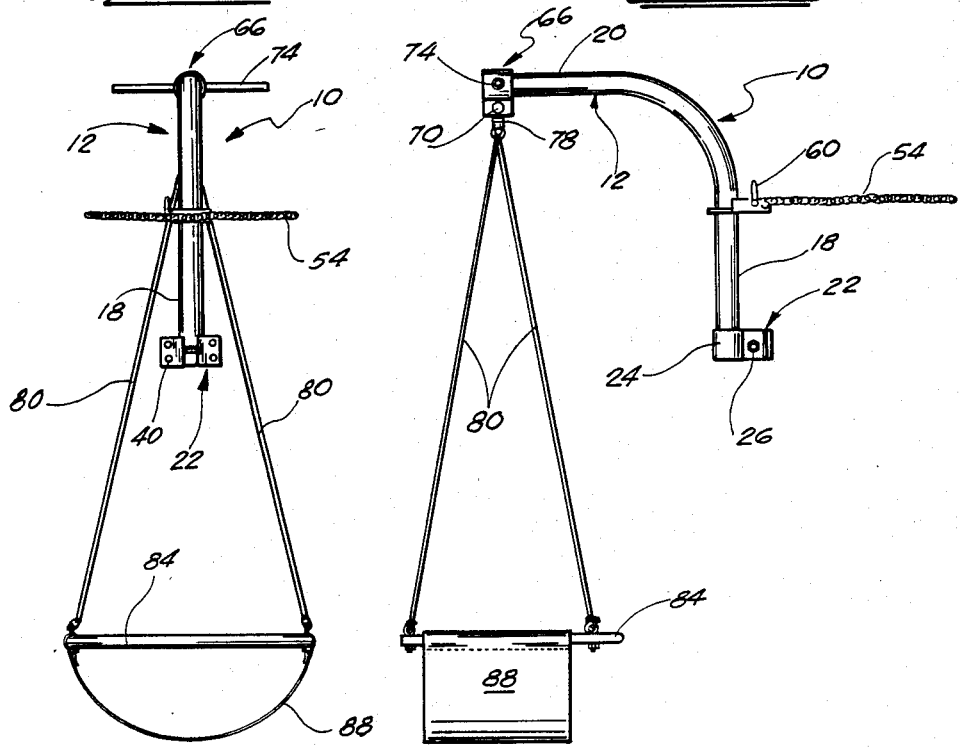
FIG. 3
FIG. 4

HUNTER'S TREE STAND

BACKGROUND OF THE INVENTION

1. Field of the Invention

The present invention pertains to a portable support, such as the type used to support a hunter up in a tree, and more specifically to a support that provides a fully pivotable seat in which the user is suspended.

2. General Background

The art and history of tree seats and tree stands, such as for hunting, is a long one. Many such devices exist to support a user high up in a tree, a pole or other columnar member. Typical examples include the devices illustrated and described in U.S. Pat. Nos. 4,458,782 issued to D. L. Meyer, 3,485,320 issued to T. V. Jones, 4,337,844 issued to R. C. Hice, Sr., 4,417,645 issued to R. E. Untz and 4,130,180 issued to J. B. Ferguson et al.

Each of these patents describe a different type of tree stand. Meyer '782 illustrates a stand with a built-in foot support; Jones '320 discloses a two-piece stand with separate seat and foot supports; Hice '844 discloses a type of hunter's sling; Untz '645 discloses a seating arrangement facing a tree; and, Ferguson et al. '180 discloses a single platform, sans seat, for climbing a tree. Although they each appear to be fully operational and useful, most of them provide the user with a viewing area of only slightly greater than 180°. While none of them give the user command over the entire 360° viewing area. A fixed tree seat facing a set direction is at its optimum performance only when the user is facing that direction. Should the user desire to look in the opposite direction, or even off to the side, the user must twist around in the stand into an uncomfortable and unstable position. The user is able to pivot to the side in the seat of Meyer '782, Jones '320 and Untz '645, but at the cost of sacrificing the stand's foot support and only by lifting his or her legs over a support. Hice '844's device is the most restrictive, prohibiting the user from even looking over his or her shoulder while Ferguson et al. '180 does provide the desired sweeping command in a 360° area, but only at the cost of standing up all day since no seat is provided.

It is thus an object of this invention to provide a user with a safe, comfortable and secure platform that will provide the user with command over the entire 360° viewing area. Another object of this invention is to enable the user to face any desired direction without requiring the user to bodily twist or position him or herself in an unsafe manner. A further object of this invention is to provide a tree stand that is lightweight, easily assembled, easily installed, and, when not in use, easily collapsed and stored.

SUMMARY OF THE PRESENT INVENTION

An apparatus for supporting a user above the ground from a columnar member, such as a tree, having a support configured, when in use, with a generally horizontal portion and a generally vertically portion. The vertical portion engages the columnar member via bracing means that are attached to a lower region of the support. When under a load, these bracing means are normally under compressive forces. Securing means are secured to the support above the bracing means and they too secure this apparatus to the columnar member. These securing means are configured to withstand, when this apparatus is loaded, generally tensile forces. Attached to the horizontal region of the support are suspension means for suspending a member from the support. This member is configured to support a load therefrom. In one embodiment, this member is a seat assembly suspended from the suspension means. In another embodiment, this member is a game hook for suspending a load, such as conquered game, from the support.

BRIEF DESCRIPTION OF THE DRAWING

For a further understanding of the nature and objects of the present invention, reference should be had to the following description taken in conjunction with the accompanying drawing in which like parts are given like reference numerals and, wherein:

FIG. 1 is a side elevational view of the preferred embodiment of the apparatus of the present invention;

FIG. 2 is a rear elevational view of the embodiment of FIG. 1;

FIG. 3 is a front elevational view of the embodiment of FIG. 1;

FIG. 4 is a side elevational view of the embodiment of FIG. 1, and the opposite view of FIG. 1;

DETAILED DESCRIPTION OF THE PREFERRED EMBODIMENT

Figure 7:
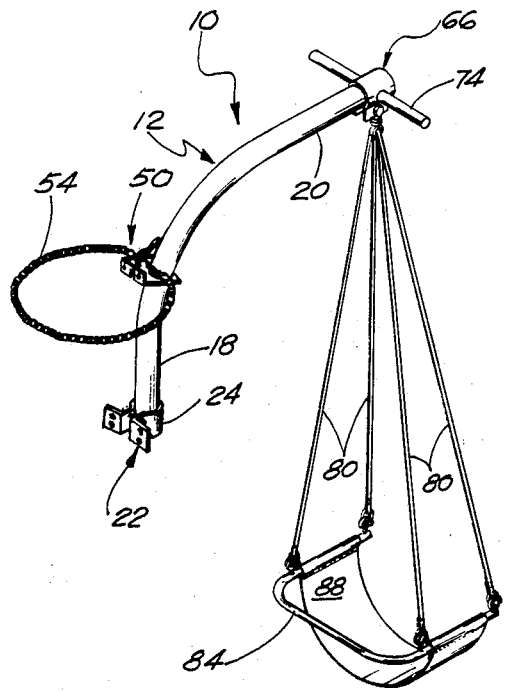
FIG. 7 is a top front perspective view of the embodiment of FIG. 1.
Figure 5:
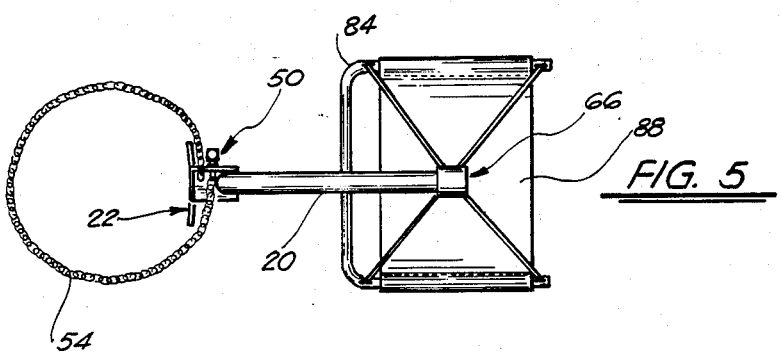
FIG. 5 is a top plan view of the embodiment of FIG. 1.
Figure 6:
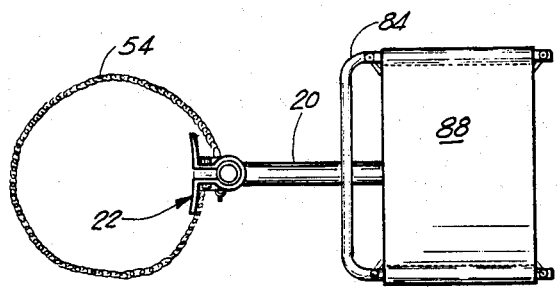
FIG. 6 is a bottom plan view of the embodiment of FIG. 1.

Referring now to the drawing, and in particular FIGS. 1-8, the apparatus of the present invention is designated generally by the numeral 10. Hunter's tree seat 10 comprises support assembly 12 which is secured to a tree 210 or other columnar member and a seat assembly 14 suspended from said support assembly 12.

Figures 12, 13, 14:
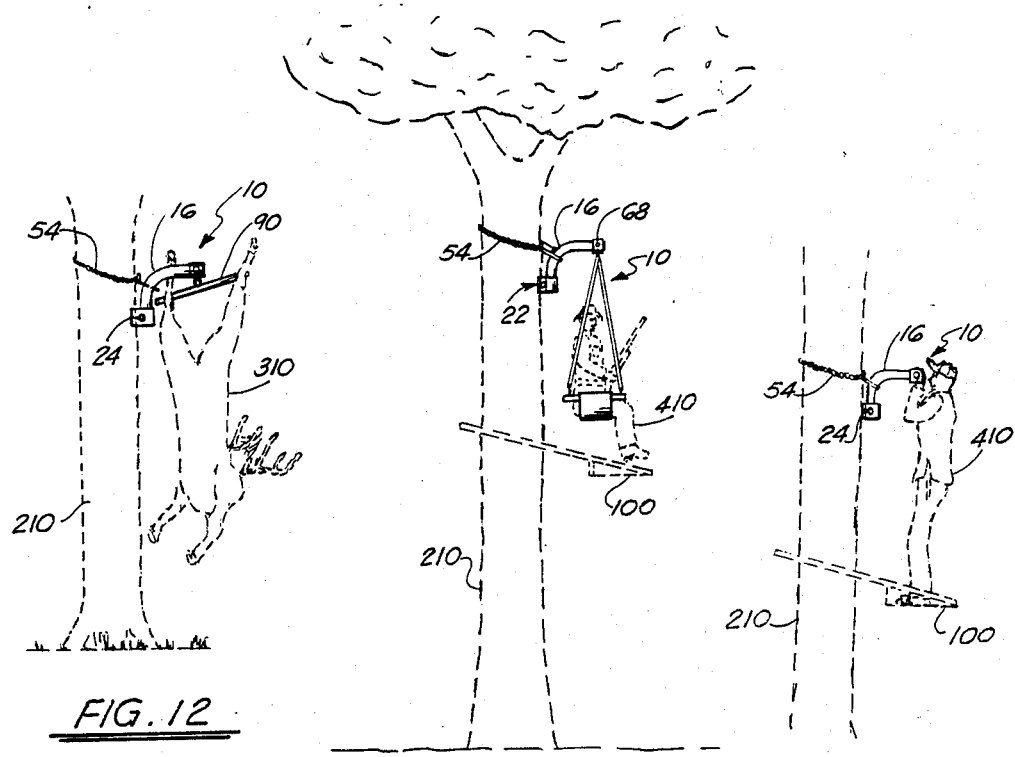
FIG. 12 is a pictorial view illustrating the operation and use of an alternate embodiment of the apparatus of the present invention by hanging captured game on the game hook.
FIG. 13 is a pictorial view illustrating the method by which the apparatus of the present invention is positioned up in a tree or other columnar member for climbing; and, FIG. 14 is a pictorial view illustrating the operation of the preferred embodiment of the apparatus of the present invention.

Support assembly 12 comprises support 16 having a generally vertical portion 18 and a generally horizontal portion 20 when tree seat 10 is in use. These horizontal and vertical portions 18, 20 are contiguous and are rigidly coupled together such that the forces applied to any part of horizontal portion 20 are effectively transferred to vertical portion 18 and hence to a tree 210 or other columnar member as best seen in FIGS. 12-14. In the preferred embodiment illustrated in FIGS. 1-8, support 16 is shown to be a single bent tubular member, however, that support 16 could also comprise a bent member of any other shape or support 16 could comprise multiple members which are rigidly connected together for the efficient transfer of any forces through these members.

Secured to a lower region of vertical portion 18 of support 16 is first securing assembly 22. Assembly 22 is designed to accomodate predominantly compressive loading and in this preferred embodiment, it consists of tubular bracket portion 24 sized to snugly fit around support 16. Bracket portion 24 is more securely fixed in place by means of nut 26 and bolt 28 which passes through apertures in protruding portions 30 of bracket portion 24. When nut 26 and bolt 28 are tightened, they fixedly clamp bracket 24 in place, as indicated by ARROWS A, best seen in FIG. 9. To prevent nut 26 from backing off or unscrewing once it is in place, bracket 24 incorporates a stop 32 that engages a portion of nut 26 thereby preventing it from threadably rotating about bolt 28 whether or not bolt 28 is also rotating.

Figure 9:
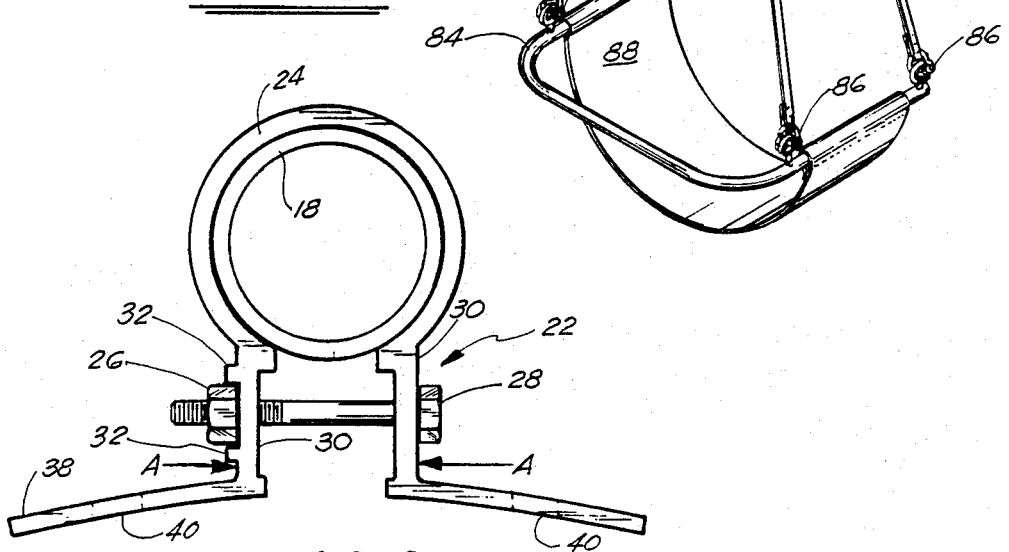
FIG. 9 is a sectional view, taken along Lines 9—9 of FIG. 8, showing the brace plate and bracket assembly in greater detail.

The top and bottom of bracket 24 may be opened thereby facilitating its ability to slide up or down along vertical portion 18 before it is clamped in place. In other embodiments (not shown), the bottom of bracket 24 may be closed or be configured with an interior lip around its perimeter thereby preventing bracket 24 from sliding along support 16. In any event, once bracket 24 is properly positioned, stop bolt 28 is secured through apertures in portions 30 of bracket 24 as shown in FIG. 9. This stop bolt 28 is then tightened against nut 26 in between stops 32 in the outer surface of portions 30 to prevent bracket 24 from any movement either about or along the longitudinal axis of support 16. In other embodiments (not shown), stop bolts may actually be passed through concentric openings in support 16 and bracket 24 to more positively restrain bracket 24 in position.

Spaced from support 16 but still a part of assembly 22 are brace plates 38. These plates 38, which are curved, are secured to bracket 24 at protruding portions 30 and they are placed against the tree 210 or other columnar member to which tree seat 10 is braced or secured. As shown in better detail in FIG. 8, brace plates 38 incorporate threaded apertures 40 sized to accommodate threaded screws 42. These screws 42 screw into and through apertures 40 and engage tree 210 or other columnar member to fixedly secure bracket 24 in place with no slippage permitted in any direction.

Figure 8:
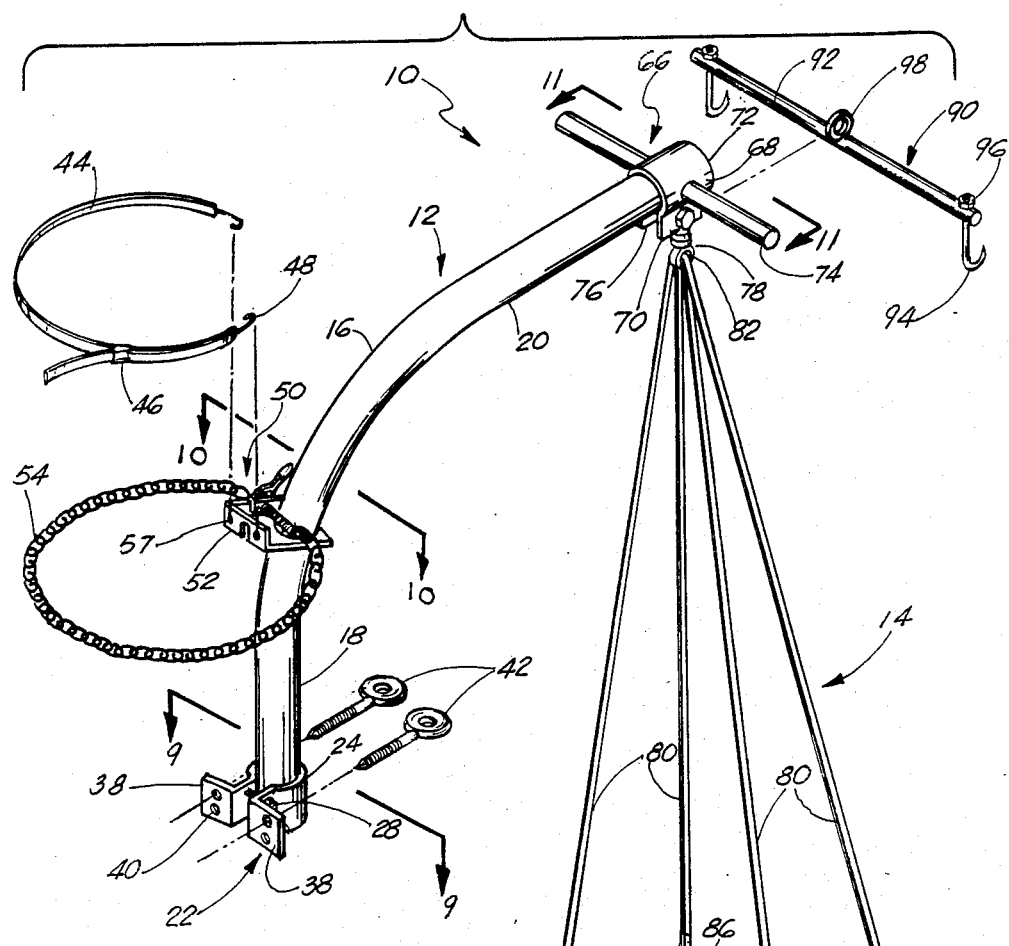
FIG. 8 is a top front perspective view of the preferred embodiment of the apparatus of the present invention showing the seating assembly in place, but also indicating where (by phantom lines) the alternate embodiment of the strap and the game hook can be installed.
Figures 10, 11:
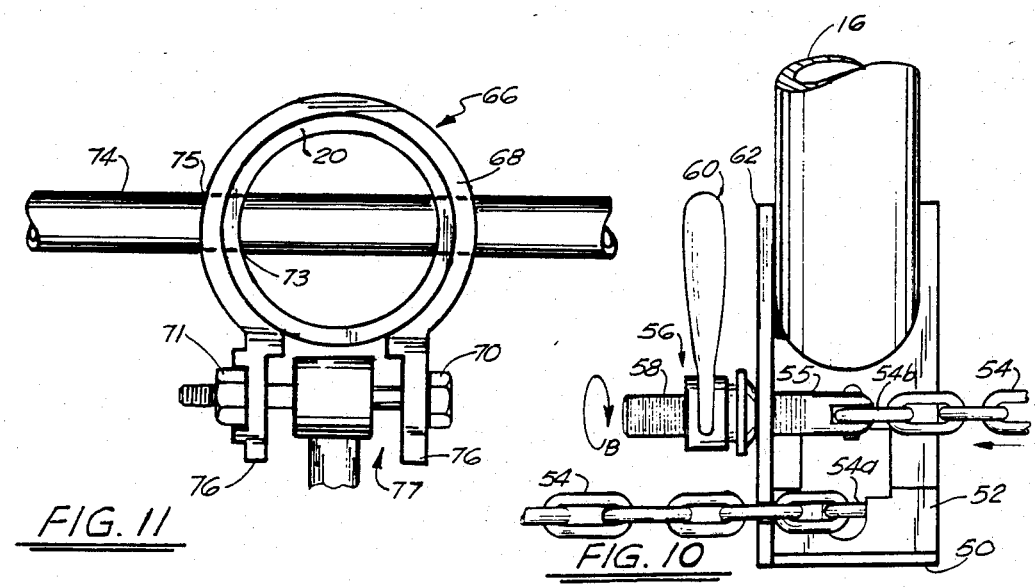
FIG. 10 is a sectional view, partially broken away, taken along Lines 10—10 of FIG. 8, showing the adjustment assembly in greater detail.
FIG. 11 is a sectional view, taken along Lines 11—11 of FIG. 8, showing the suspension assembly in greater detail.

Above bracket 24 and secured to support 16 (by welding in the preferred embodiment) is second securing assembly or chain assembly 50, best seen in FIGS. 8 and 10. This assembly 50 includes second brace plate 52 having an opening therethrough sized slightly larger than the diameter of support 16 for accepting support 16. This configuration enables plate 52 to be fixedly secured to support 16 as needed for proper and secure installation of tree seat 10.

FIG. 10 provides a better detail of chain assembly 50 and, as shown, this assembly 50 comprises an elongated tensile member which in this embodiment is chain 54 along with an adjustment assembly 56. One end 54a of chain 54 is fixedly secured to plate 52 while the other end 54b of chain 54 is secured to adjustment assembly 56. As best indicated if FIG. 10, adjustment assembly 56 includes connecting slot and pin 55, adjustment screw 58 and handle 60. Adjustment screw 58 passes through reinforced lip 62 of plate 52 and by turning handles 60 in the direction of ARROW B, adjustment screw 58 is forced away from lip 62. This shortens the overall length of chain 54 which is wrapped around the tree 210 or other columnar member. The result of this rotation of handle 60 is to increase the tension on chain 54 thereby more securely holding tree seat 10 in position. To release this hold, handle 60 is rotated in a direction opposite ARROW B, thereby causing adjustment screw 58 to move towards lip 62 causing the overall length of chain 54 to increase. In other embodiments, chain 54 may, in actuality, not be composed of any metal compound but may be of a nylon or other flexible composition or of any other material that can safely withstand a tension load.

An alternate embodiment of second securing means 50, best seen in FIG. 8, incorporates an elongated strap 44 sized to extend around the circumference of the tree 210 or other columnar member. This strap 44 would preferably comprise a buckle or clamp 46 to make strap 44 fully adjustable as needed. Strap 44 would also preferably be secured to hooks 48 that are configured to engage apertures 57 in brace plate 52. In any event, strap 44 would secure assembly 50, and hence brace plate 52 against the tree 210 or other columnar member thereby preventing its movement or slippage when under a load.

Referring to FIGS. 8 and 11, seat assembly 14 is shown secured to suspension assembly 66 attached at the end of the horizontal portion 20 of support 16. Suspension assembly 66 includes a tubular bracket portion 68 that is clamped around support 16 and secured by bolt 70 and nut 71. The tightening of bolt 70 and nut 71 ensures the clamping of bracket 68 around support 16. Alternately, bracket 68 may have a lip or other retaining feature (not shown) at end 72 to ensure proper placement on horizontal portion 20 of support 16.

Extending outwardly on both sides of bracket portion 68 are handles 74 which may or may not be configured to pass all the way through apertures 75, 73 of bracket portion 68 and support 16, respectively, as shown in FIG. 11. Should they pass completely through, as shown in FIG. 11, then, handles 74 are configured to be easily slid side-to-side with the capability of one side being longer than the other as needed. Should they not pass through apertures 73, 75, then handles 74 would normally be threadably screwed into support 16 to thereby prevent any slippage of bracket portion 68 around support 16. Another embodiment would have handles 74 secured only to bracket portion 68 without engaging support 16 or with handles 74 only pressing up against support 16. In any event, handles 74 would normally extend orthogonally outward from horizontal portion 20 of support 16 in a generally horizontal plane.

Tubular bracket portion 68 is configured such that bolt 70 never completely compresses the ends 76 of assembly 66 together. Instead, there is always a gap 77 between the ends 76 of assembly 66. As best seen in FIG. 8, within this gap 77 and secured around bolt 70 is a suspending pin 78 that supports a suspended load from bolt 70. Suspending pin 78 is configured to enable the suspended load to rotate about a vertical axis while the upper eyelet of suspending pin 78 is sized to permit its rotation about the longitudinal axis of generally horizontal bolt 70. Thus, support assembly 12 can be installed at any angle and still support vertical loading.

As best shown in FIGS. 1–8, a series of cables 80 are attached or passed through the bottom eyelet 82 of suspending pin 78. As indicated earlier, this bottom eyelet 82 is rotatable about a vertical axis with respect to the adjacent upper eyelet (not shown) of suspending pin 78. Consequently, cables 80 are pivotable with respect to support 16 and likewise any items supported by cable 80.

Cables 80 are in turn secured to seat frame 84 via pin and cleve connections 86. Seat frame 84 is U-shaped as shown with seat 88 secured to the opposite sides of frame 84. In this embodiment, seat 88 is illustrated as a cloth, nylon, or other flexible fabric, but it may also be composed of a material more rigid in nature.

Also shown in FIG. 8, is an alternate attachment 90 to tree seat 10. This attachment or game hook 90 is positioned, as shown in FIGS. 8 and 12, around bolt 70 in place of suspending pin 78 and cable 80. Game hook 90 consists of a rigid bar 92 having a pair of hooks 94 secured at either end. These hooks 94 may be secured to bar 92 such as by nuts 96 as shown. Positioned intermediate hooks 94 is suspending ring 98 that fits around bolt 70 between the ends of bracket portion 68. By using game hook 90, a hunter can suspend any captured game 310 from support 16 for purposes of gutting, cleaning or otherwise (see FIG. 12).

Referring now to FIGS. 13 and 14, the use and operation of hunter's tree seat 10 is illustrated. FIG. 13 shows a user (hunter 410) climbing tree 210 (or other columnar member) in conjunction with conventional foot stand 100 (see, for example U.S. Pat. Nos. 4,230,203 or 4,331,216 or 4,316,526 or 3,856,111). It should be noted that in this illustration, the user is not utilizing strap 44 but instead is using chain 54 and screws 42 to secure assembly 50 and brace plates 38 in position.

The user 410 climbs the tree with foot stand 100 in the normal manner by taking advantage of handles 74 as shown in FIG. 13. First support assembly 12 of tree seat 10 is positioned around tree 210 and then foot support 100 (or vice versa) with each one being alternately raised by the user until the desired height is reached. Once properly elevated, the user would then tighten chain 54 and threadably insert screws 42 into brace plates 38 and thereby into engagement with the tree 210 to secure tree seat 10 in place. Afterwards, the user would install suspending pin 78 and cables 80 which had previously been removed for ease in climbing.

Once properly secured and assembled, the user 410 would support him or herself upon seat 88 as best shown in FIG. 14. By doing so, the loading of user 410 is transferred to horizontal portion 20 of support 16. Support 16, in turn, transfers the load to tree 210 or other columnar member via chain 54, which is in tension, and brace plates 38, which are in compression. From this vantage point above the ground, user 410 is able to pivot or swivel 360° so that he can easily survey the entire area. This ability to pivot also aids the user in setting up for proper aim.

To return to ground level, the user would losen chain 54 and remove screws 42 thereby enabling tree seat 10 to be lowered. Seat frame 84 and cables 80 may or may not be attached for this operation depending on the need and skill level of the user.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. An apparatus for engaging substantially upright columnar members, including trees, for supporting a person above the ground comprising:
   (a) a support means having a generally vertical region and a generally horizontal region, said vertical and horizontal regions being contiguous for the transfer of loading forces between them;
   (b) bracing means attached to a lower end of said generally vertical region for bracing said support means against a columnar member, said bracing means being, when loaded, under compressive forces;
   (c) securing means attached to said support means above said bracing means for securing said support means to said columnar member, said securing means being, when loaded, under tensile forces; and,
   (d) suspension means for suspending a seat member from said support means, said suspension means secured to said generally horizontal region with said seat member being configured to support a load therefrom.

2. The apparatus of claim 1, wherein said suspended seat member is spaced apart from said columnar member.

3. The apparatus of claim 2, wherein said seat member includes a rotatable coupler secured to said suspension means thereby enabling said seat member to rotate with respect to said suspension means and hence said support means.

4. The apparatus of claim 3, wherein said support means comprises an arcuate tubular member arcing through approximately 90° to form said vertical and horizontal regions.

5. The apparatus of claim 4, wherein said bracing means includes at least one curved brace plate for compression against said columnar member.

6. The apparatus of claim 5, wherein said brace plate is configured with at least one threaded aperture therethrough and wherein said bracing means further comprises a threaded screw for insertion through said aperture and into engagement with said columnar member.

7. The apparatus of claim 6, wherein said bracing means comprise an adjustable elongated strap sized to encircle said columnar member and secure said brace plate in engagement with said columnar member.

8. The apparatus of claim 6, wherein said securing means comprise an elongated tensile member sized to encircle said columnar member and secure said support to said columnar member, the length of said tensile member being selectively adjustable.

9. The apparatus of claim 8, wherein said elongated tensile member is a chain link.

10. The apparatus of claim 8, wherein said seat member comprises a generally U-shaped seat frame and a seat portion suspended from said rotatable coupler, said seat frame and said seat portion being freely rotatable about a generally vertical axis.

11. The apparatus of claim 10, wherein said seat frame and said seat portion are suspended by cables from said rotatable coupler.

12. The apparatus of claim 11, further comprising an elongated handle secured to said horizontal portion of said support means, said handle extending in a generally horizontal plane or orthogonally to said horizontal portion of said support means.

13. The apparatus of claim 1, further comprising a game hook for supporting a load from said support means.

14. An apparatus for engaging substantially upright columnar members, including trees, for supporting a person above the ground comprising:
 (a) an elongated arcuate support means arcing through an approximately 90° angle to form a generally horizontal portion and a generally vertical portion;
 (b) first connecting means for securing said support means to a columnar member, said first connecting means including at least one (1) brace plate secured to a lower region of said vertical portion of said support, said brace plate configured to be pressed against said columnar member and having at least one aperture therethrough for insertion of a fastener to fixedly secure said plate to said columnar member;
 (c) second connecting means for securing said support means to a columnar member, said second connecting means being secured to said support at a position above said first connecting means, said second connecting means comprising an adjustable tensile force member secured around said columnar member for withstanding the tensile forces applied to it from said support means;
 (d) suspension means for supporting a load suspended from said support means, said suspension means secured to said horizontal portion of said support means and comprising a rotatable coupler from which said load is suspended; and,
 (e) seat means for accommodating the body of a user in a sitting position, said seat means including a generally U-shaped frame suspended from said rotatable coupler.

15. The apparatus of claim 14, wherein said first connecting means is fixedly secured to said support and wherein said second connecting means is movable along said support with respect to said first connecting means.

16. The apparatus of claim 15, wherein said tensile force member is a chain with said chain being secured to adjustment means for selectively adjusting the length of said chain.

17. The apparatus of claim 15, wherein said suspension means further comprises a climbing handle for use in positioning said support at a pre-determined elevation.

18. The apparatus of claim 14, further comprising a game hook member suspendable from said support for supporting a load at a pre-selected elevation, said game hook member comprisig an elongated bar having at least one (1) hook secured thereto and a ring member for securing said game hook member to said support means.

* * * * *